United States Patent
Hosoi et al.

[11] Patent Number: 6,126,193
[45] Date of Patent: Oct. 3, 2000

[54] STEERING WHEEL

[75] Inventors: Akio Hosoi, Komaki; Atsushi Nagata, Inazawa; Katsunobu Sakane, Ichinomiya, all of Japan

[73] Assignee: Toyoda Gosei Co., Ltd., Aichi-ken, Japan

[21] Appl. No.: 08/877,086

[22] Filed: Jun. 17, 1997

[30] Foreign Application Priority Data

Jun. 18, 1996 [JP] Japan ..................................... 8-156909

[51] Int. Cl.⁷ .................................................. B60R 21/16
[52] U.S. Cl. ....................................... 280/731; 280/728.2
[58] Field of Search ................................ 280/731, 728.2, 280/738; 188/371, 377

[56] References Cited

U.S. PATENT DOCUMENTS

| | | | |
|---|---|---|---|
| 4,627,307 | 12/1986 | Yamazawa et al. | 74/552 |
| 5,090,731 | 2/1992 | Fujita et al. | 280/777 |
| 5,207,450 | 5/1993 | Pack, Jr. et al. | 280/738 |
| 5,243,877 | 9/1993 | Numata | 74/552 |
| 5,720,494 | 2/1998 | Hosoi et al. | 280/731 |

FOREIGN PATENT DOCUMENTS

| | | | |
|---|---|---|---|
| 2-133955 | 11/1990 | Japan . | |
| 4-166458 | 6/1992 | Japan . | |
| 6-55987 | 3/1994 | Japan | 280/728.2 |

*Primary Examiner*—Paul N. Dickson
*Assistant Examiner*—Faye M. Fleming
*Attorney, Agent, or Firm*—Pillsbury Madison & Sutro LLP

[57] ABSTRACT

A steering wheel for vehicles includes a metal ring core connected to a steering shaft by a boss plate and at least one spoke core. The ring core and the spoke core are covered with surface layers. A pad is arranged above the boss plate and at the center of the ring core. The pad is formed integrally with the surface layers. An air bag device is arranged between the pad and the boss plate to protect the driver of a vehicle when an impact is applied to the vehicle. The air bag device is supported by a holder which is connected to the spoke cores. The holder includes a mechanism for absorbing load that is applied to the steering wheel.

8 Claims, 7 Drawing Sheets

STEERING WHEEL

BACKGROUND OF THE INVENTION

1. Field of the Invention

The present invention relates to steering wheels for vehicles.

2. Description of the Related Art

A typical steering wheel includes an annular gripping ring and a pad. The pad is located at the center of the ring and connected to the ring by spokes. A metal ring core is embedded in the ring while a metal spoke core is embedded in each spoke. The ring core and the spoke cores are covered with a surface layer made of polyurethane foam, or the like. The spoke cores are coupled to a boss plate located below the pad. The boss plate is fixed to an end of a steering shaft.

To assemble such a steering wheel, the boss plate is first fixed to the steering shaft. An air bag device is then mounted on the boss plate. The air bag device is covered by the pad.

When the steering wheel receives a load that is greater than a predetermined level, the spoke cores deform and allow the entire steering wheel to be displaced downward and toward the end of the steering shaft. This absorbs and decreases the load applied to the steering wheel.

Japanese Unexamined Utility Model Publication No. 2-133955 describes a steering wheel having a surface layer and a pad that are formed integrally. This structure eliminates slight gaps between the layer and the pad and thus improves the appearance of the steering wheel. Such a steering wheel also needs a mechanism for absorbing and decreasing load that acts thereon.

In the steering wheel having an integral pad and surface layer, the air bag device is coupled to the spoke cores. Thus, when the steering wheel receives a load that is greater than a predetermined level, the air bag device is displaced downward together with the spoke cores. However, if the space between the air bag device and the boss plate is small, the boss plate restricts the movement of the air bag device. This reduces marginal space that is necessary to allow deformation of the spoke cores. As a result, this may lead to insufficient absorption of the load applied to the steering wheel.

In order to solve the above problem, the distance between the air bag device and the boss plate may be enlarged to increase the marginal space that allows deformation of the spoke cores. This would allow a further downward displacement of the spoke cores and the air bag device. However, the increased distance between the air bag device and the boss plate increases the axial thickness of the steering wheel. This enlarges the steering wheel.

SUMMARY OF THE INVENTION

Accordingly, it is an objective of the present invention to provide a steering wheel capable of sufficiently absorbing and decreasing a load that is greater than a predetermined level without enlarging the steering wheel.

To achieve the above objective, a steering wheel of the present invention includes a metal ring core, metal spoke cores and a boss plate. The metal ring core and at least one of the spoke cores connect the ring core to a steering shaft. The ring core and the spoke cores are covered with surface layers. A pad is arranged above the boss plate and at a center portion of the ring core. The pad is formed integrally with the surface layers. An air bag device is arranged between the pad and the boss plate to protect the driver of a vehicle when the vehicle receives impact. A holder is connected to the spoke cores so as to support the air bag device. The holder includes a mechanism for absorbing load applied to the steering wheel.

BRIEF DESCRIPTION OF THE DRAWINGS

The features of the present invention that are believed to be novel are set forth with particularly in the appended claims. The invention, together with objects and advantages thereof, may best be understood by reference to the following description of the presently preferred embodiments together with the accompanying drawings in which

DETAILED DESCRIPTION OF THE PREFERRED EMBODIMENTS

An embodiment of a steering wheel according to the present invention will hereafter be described with reference to the drawings.

Figure 1:
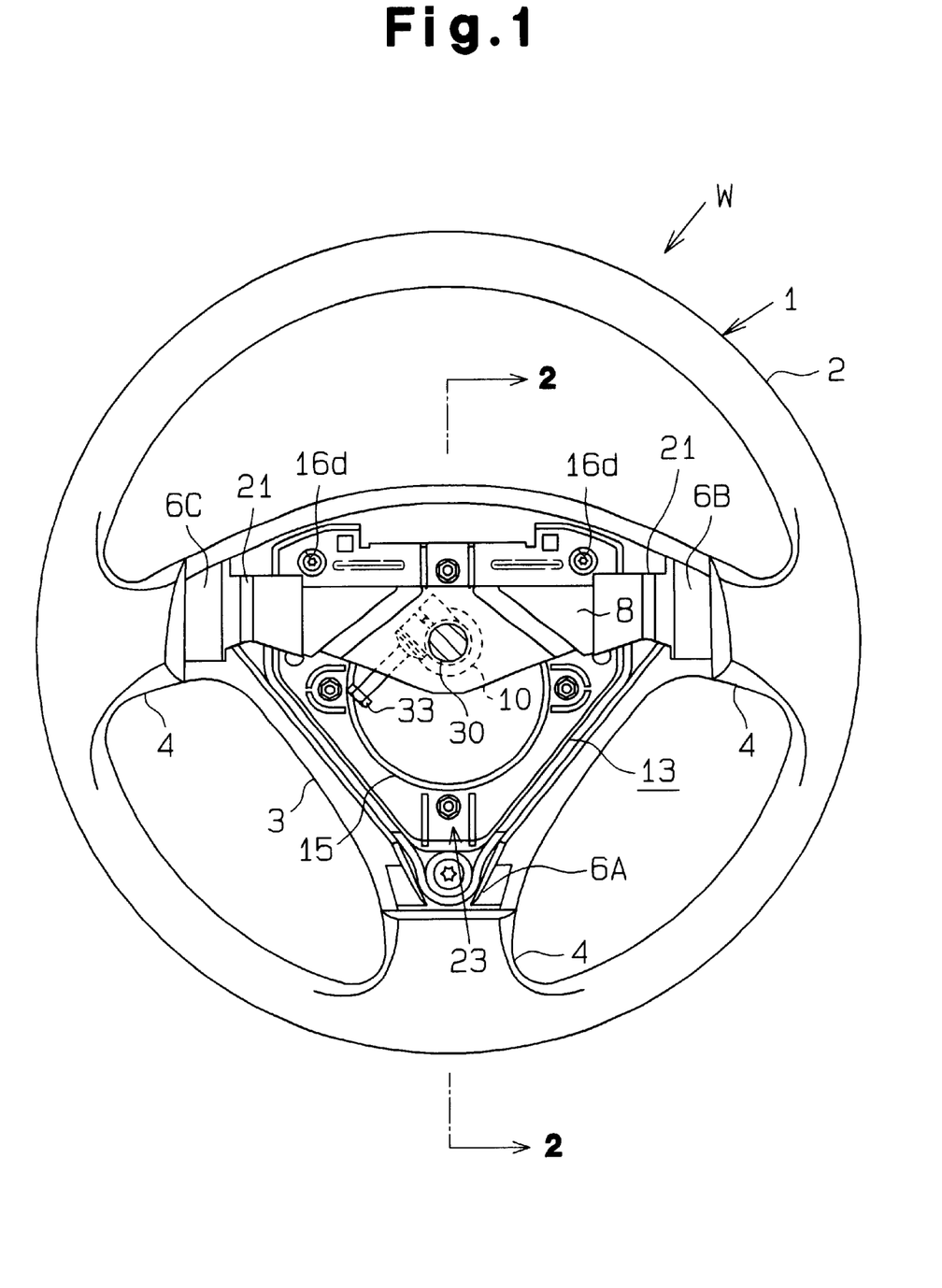
FIG. 1 is a bottom view showing an embodiment of a steering wheel according to the present invention.
Figure 2:
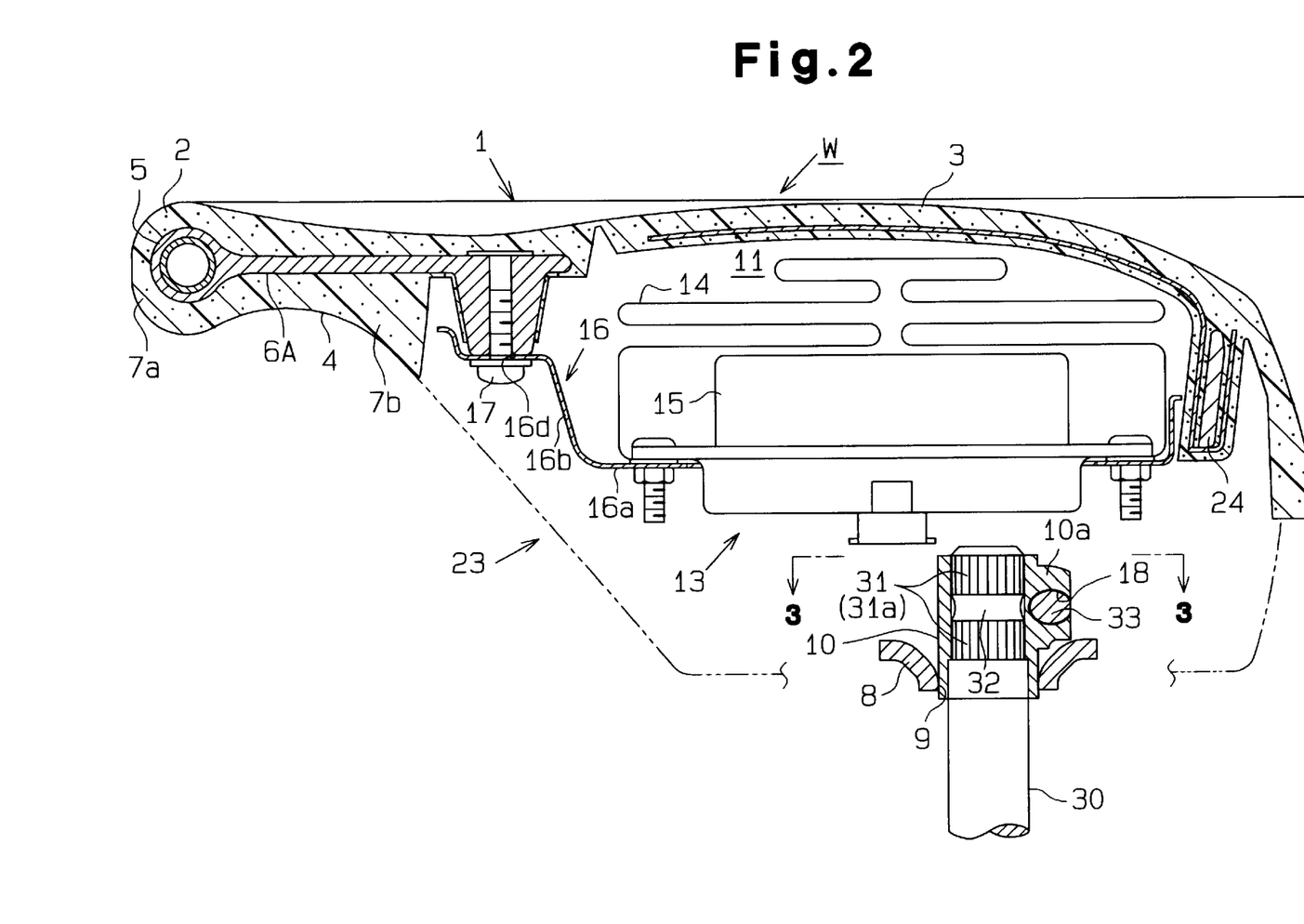
FIG. 2 is an enlarged cross-sectional view of the steering wheel taken along line 2—2 in FIG. 1.
Figure 3:
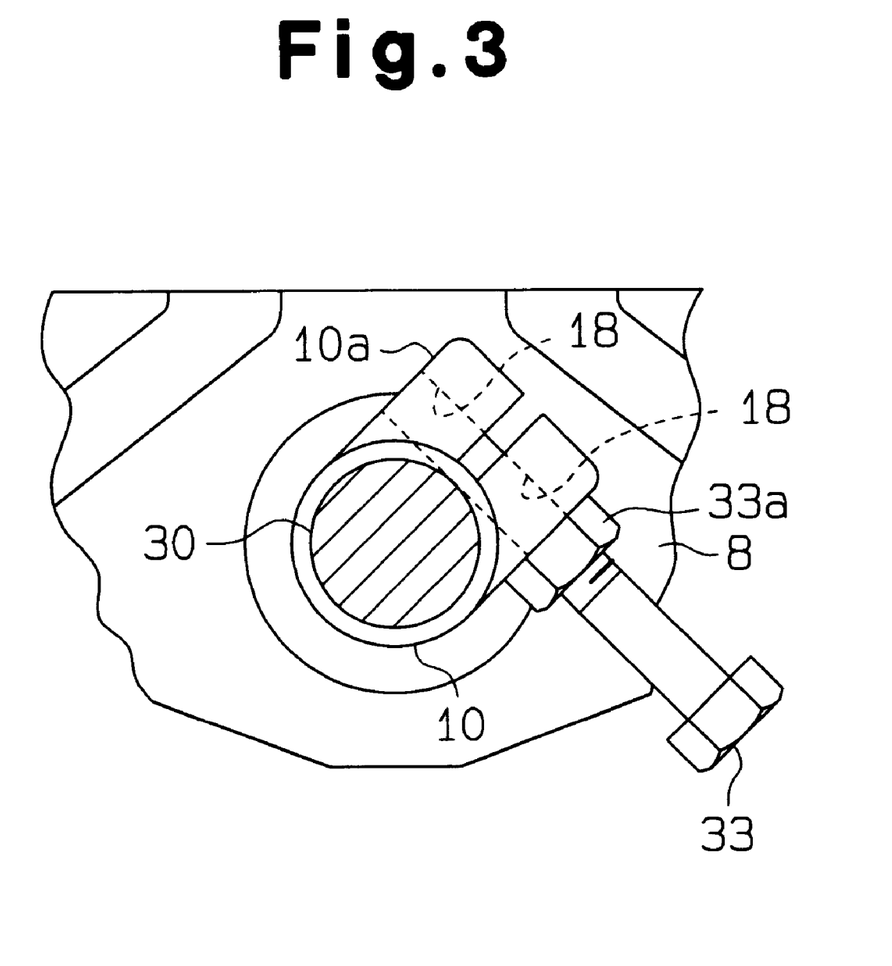
FIG. 3 is an enlarged partial cross-sectional view of the steering wheel taken along line 3—3 in FIG. 2.

As shown in FIGS. 1 and 2, a body 1 of a steering wheel W includes an annular gripping ring 2, a pad 3 arranged in the center of the ring 2, and three spokes 4 extending from the ring 2.

The ring 2 includes a metal ring core 5, which is made of a steel pipe or the like, and a surface layer 7a, which covers the ring core 5. The spokes 4 include metal spoke cores 6A, 6B, 6C, which are die cast from a light metal such as an aluminum alloy, and a surface layer 7b which covers the spoke cores 6A, 6B, 6C. The surface layers 7a, 7b and the pad 3 are formed integrally from a soft synthetic resin such as polyurethane foam. The body 1 is coupled to a boss plate 8 by arms 21 (see FIG. 4).

An accommodating recess 11 is defined below the pad 3. The recess 11 is encompassed by the surface layer 7b. A membrane switch (not shown) for activating a horn and an air bag device 13 are accommodated in the recess 11.

The air bag device 13 includes an air bag 14 and an inflator 15. The air bag 14 is retained in a folded state. When an acceleration that is greater than a predetermined value is applied to the vehicle, the inflator 15 inflates the air bag 14 with gas. A bag holder 16 secures the air bag device 13 in the recess 11. The bag holder 16 is press formed from a metal plate made of steel or the like.

Figure 6:
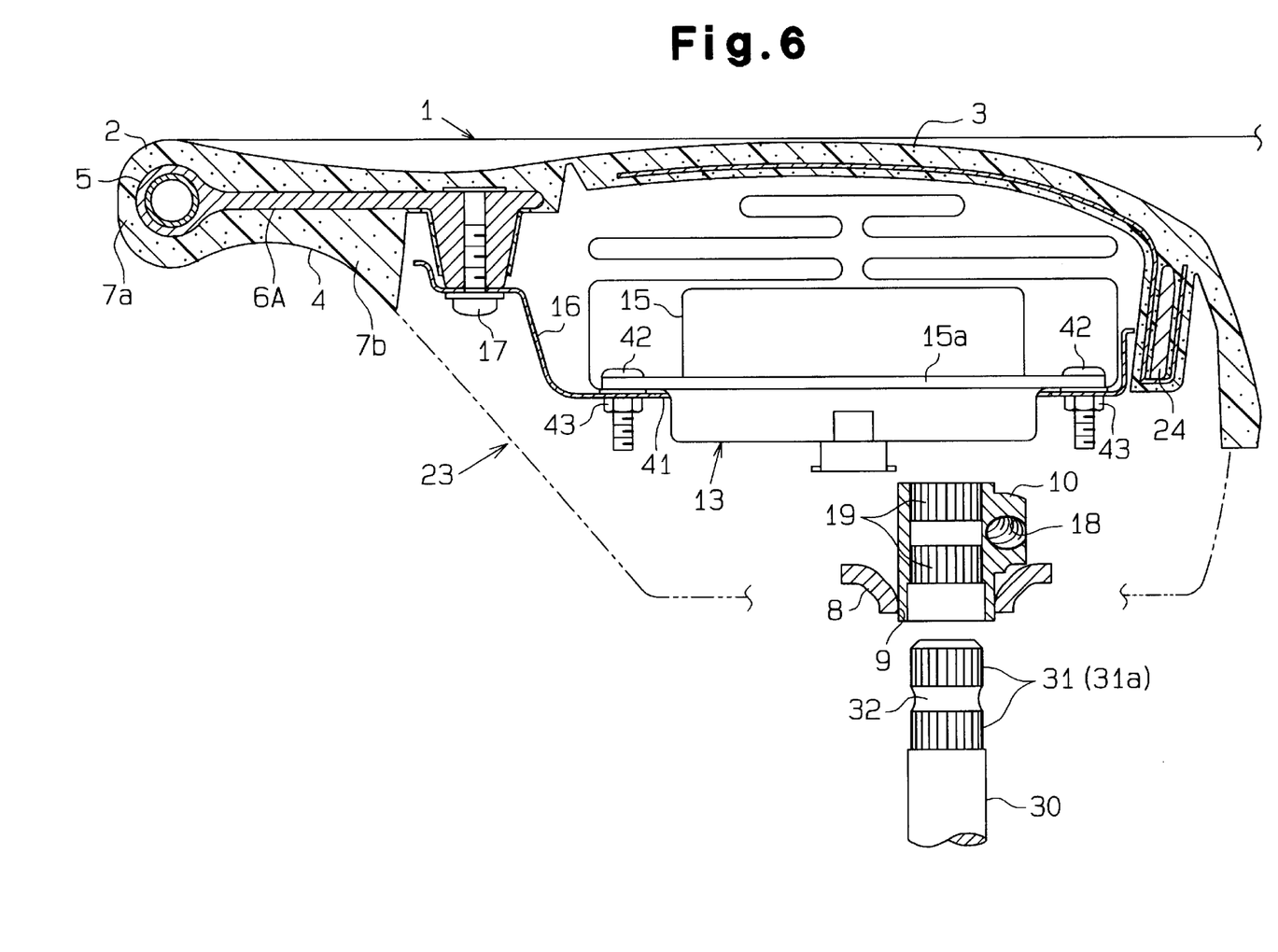
FIG. 6 is a cross-sectional view showing the steering wheel mounted on a steering shaft.
Figure 7:
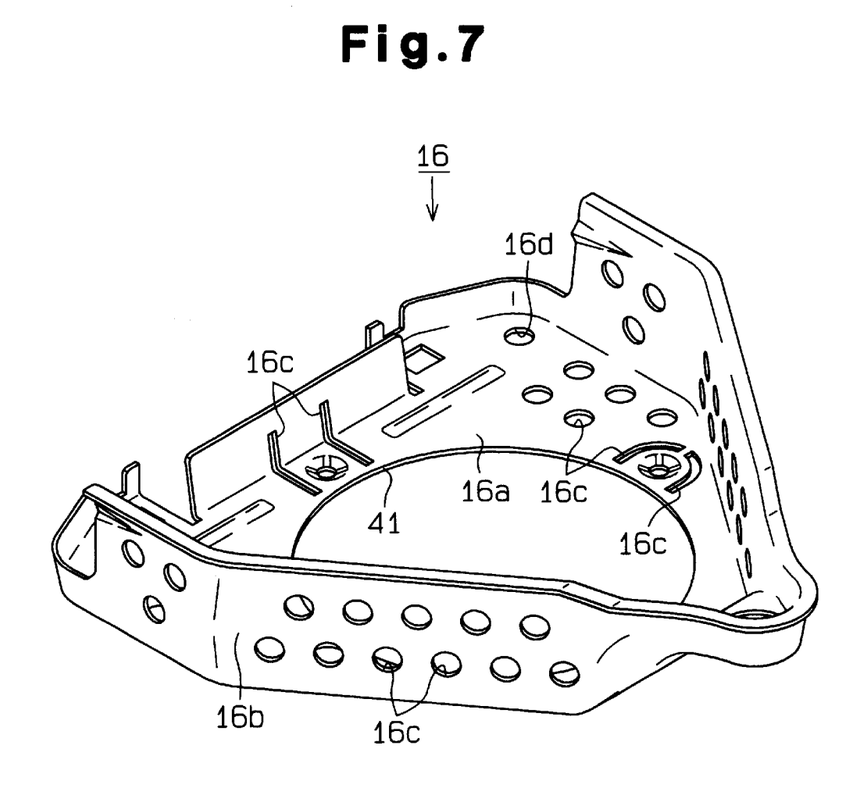
FIG. 7 is an enlarged perspective view showing a bag holder structure of the steering wheel.

The bag holder 16 has a plurality of threaded holes 16d (FIGS. 1, 2 and 7) and holes 16e. The spoke cores 6B, 6C are connected to each other by a connecting bar 24 (see also FIG. 4). As shown in FIG. 2, a bolt 17 is screwed into each threaded hole 16d to secure the bag holder 16 to the spoke core 6A and the bar 24. As shown in FIG. 7, the bag holder 16 includes a flat support portion 16a and a connecting wall portion 16b. A circular opening 41 is provided in the center of the support portion 16a to receive the inflator 15 (see FIG. 1). The wall portion 16b is formed integrally with the periphery of the support portion 16a and extends upward. As shown in FIG. 6, the inflator 15 includes a flange 15a. Flange 15a has a plurality of holes 15b. With the inflator 15 inserted through the opening 41, the flange 15a is secured to the support portion 16a by a plurality of bolts 42 extending through holes 15b and 16e and corresponding nuts 43.

As shown in FIG. 2, longitudinal or axial, serrations, or splines, 31 are formed on the distal end of the steering shaft 30. An annular groove 32 is defined between the serrations 31. The serrations 31 include a predetermined number of axial grooves 31a (generally about thirty). A through hole 9 is defined in the center of the boss plate 8. A steel adaptor 10 is inserted in the through hole 9 and welded to the boss plate 8.

As shown in FIGS. 2, 3, 5 and 6, the adaptor 10 includes a cylindrical portion and a pair of clamping pieces 10a. The cylindrical portion is located at the lower part of the adaptor 10. The clamping pieces 10a are located at the upper part of the adaptor 10 and extend substantially parallel with each other. One of the clamping pieces 10a is provided with a bolt hole 18, and the other is provided with a through hole 18a. Serrations 19 corresponding to the serrations 31 of the steering shaft 30 are formed at the inner surface of the adaptor 10. The adaptor 10 is mounted on the steering shaft 30 by meshing the serrations 19 with the serrations 31. A bolt 33 is then inserted through the hole 18a and then screwed into the bolt hole 18. The bolt 33 is then fastened to the bolt hole 18a by a lock nut 33a. This allows the clamping pieces 10a of the adaptor 10 to clamp the distal end of the steering shaft 30. In this manner, the adaptor 10 firmly fastens the boss plate 8 to the steering shaft 30.

Figure 4:
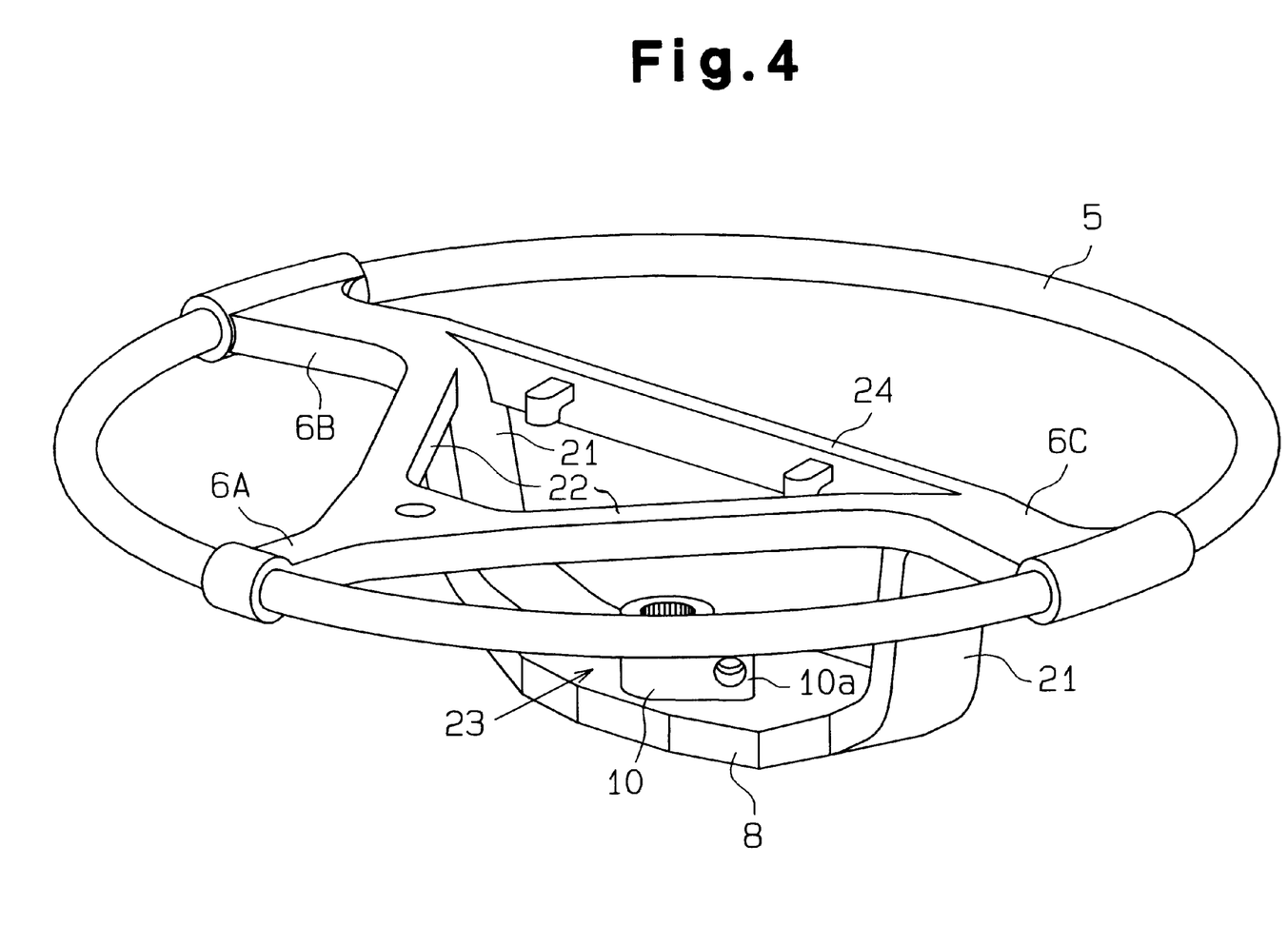
FIG. 4 is a perspective view showing the metal core structure of the steering wheel.

As shown in FIG. 4, the boss plate 8 is arranged at a position lower than the metal ring core 5 and the metal spoke cores 6B, 6C. An arm 21 extends from each end of the boss plate 8. The arms 21 are formed integrally with the boss plate 8 and connect the boss plate 8 to the spoke cores 6B, 6C.

The spoke cores 6B, 6C are coupled to the spoke core 6A by connecting bars 22. This structure firmly secures the spoke cores 6A–6C, the ring core 5, and the boss plate 8 to each other. A relatively large space 23 is defined between the boss plate 8, the arms 21, and the connecting bars 22.

The procedures to mount the steering wheel W on the steering shaft 30 will now be described.

Figure 5:
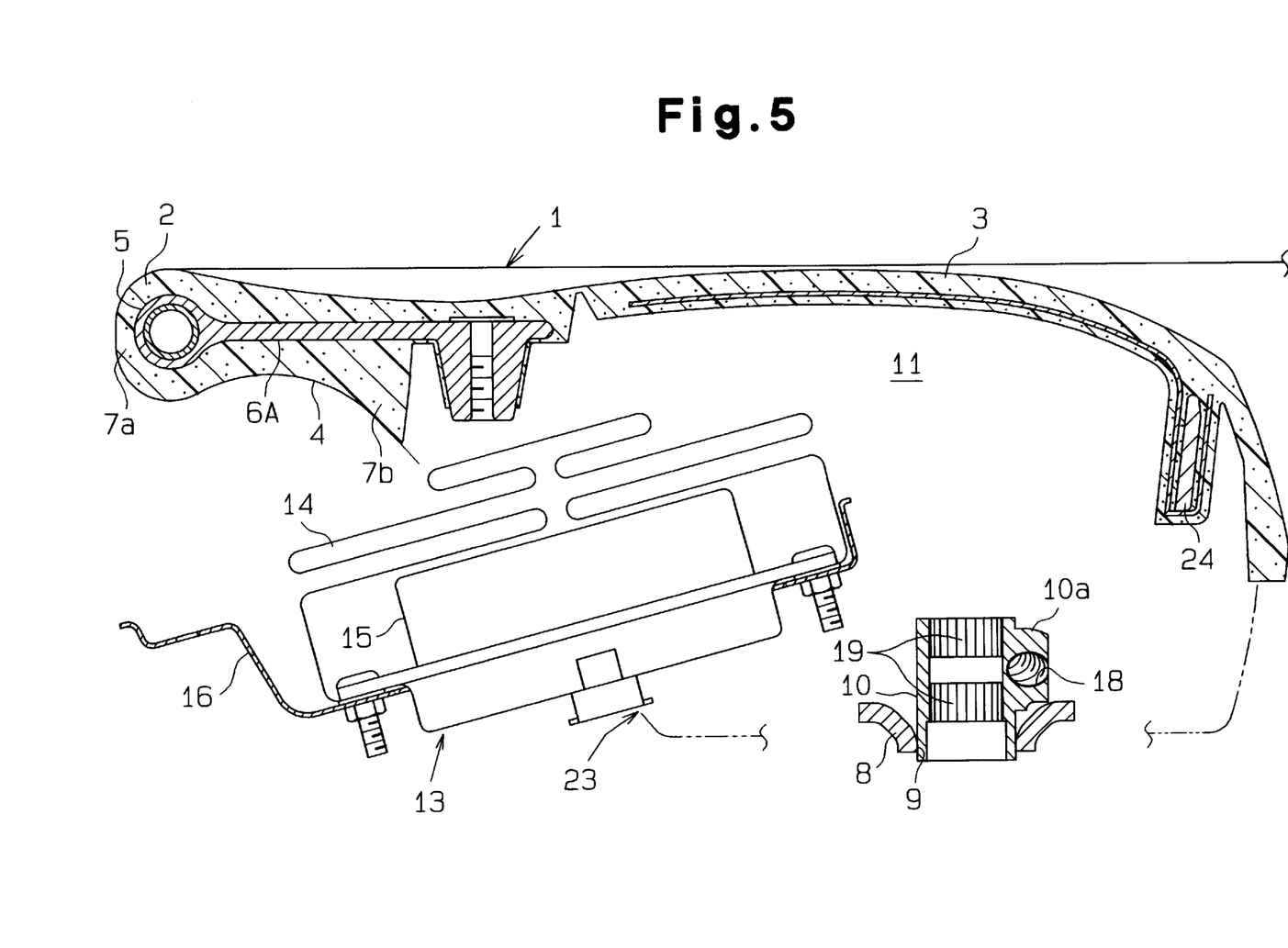
FIG. 5 is a cross-sectional view showing the steering wheel body before installing an air bag device therein.

As shown in FIGS. 4 and 5, the air bag device 13, together with the bag holder 16, is inserted into the space 23 defined by the boss plate 8, the arms 21, and the connecting bars 22 and 24. The bag holder 16 is secured to the spoke core 6A and the connecting bar 24 by the bolts 17. Since the space 23 is relatively large, the air bag device 13 is easily installed in the wheel body 1.

Afterward, as shown in FIG. 6, the wheel body 1 is mounted on the distal end portion of the steering shaft 30 by means of the adaptor 10. This meshes the serrations 31 of the steering shaft 30 with the serrations 19 of the adaptor 10. The bolt 33 is then inserted into the hole "18a" and then screwed into the bolt hole 18 of the adaptor 10. Subsequently, the lock nut 33a fastens the bolt 33 and secures the adaptor 10 to the steering shaft 30.

As described above, the adaptor 10 is fixed to the boss plate 8 of the wheel body 1 before securing the wheel body 1 to the steering shaft 30. Therefore, the wheel body 1 is securely fastened to the steering shaft 30.

As shown in FIG. 7, a plurality of openings 16c are provided in the support portion 16a and the wall portion 16b of the bag holder 16. The openings 16c absorb impact that is applied to the steering wheel W. The openings 16c include a plurality of circular holes and a plurality of slits. The circular holes are arranged throughout the entire holder 16. The slits are arranged near the holes 16e through which the bolts 42 are inserted to fasten the inflator 15 to the holder 16.

A detecting device is installed in a vehicle employing the steering wheel W to detect acceleration. When the vehicle crashes and a predetermined level of acceleration is detected by the detecting device, the inflator 15 instantaneously generates gas. The gas inflates the air bag 14. This causes the air bag 14 to rip open the pad 3.

When the wheel body 1 receives a load that is greater than a predetermined level during a crash, the spoke cores 6A–6C are deformed. This displaces the air bag device 13 toward the shaft 30 until the air bag device 13 abuts against the boss plate 8.

Figure 8:
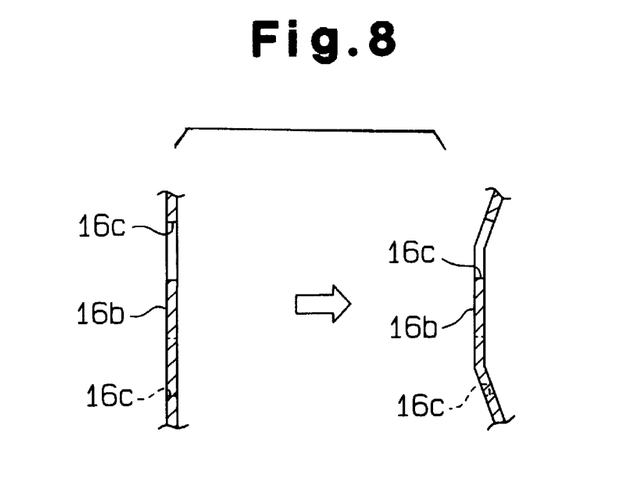
FIG. 8 is a partial cross-sectional view showing the operation of the bag holder.

However, as shown in FIG. 8, the plurality of openings 16c provided in the bag holder 16 allows deformation of the holder 16. Such deformation enables continuous absorption of the impact applied to the steering wheel W after contact between the air bag device 13 and the boss plate 8. Accordingly, the impact is efficiently absorbed and decreased without designing the steering wheel to have an increased distance between the air bag device 13 and the boss plate 8.

As described above, the openings 16c are also provided in the support portion 16a of the bag holder 16. This allows the support portion 16a to deform and absorb impact. Therefore, impact may be absorbed by the bag holder 16 even when he air bag device 13 is not inflated.

Although only one embodiment of the present invention has been described herein, it should be apparent to those skilled in the art that the present invention may be embodied in many other specific forms without departing from the spirit or scope of the invention. Particularly, it should be understood that the present invention may also be modified as described below.

In addition to the openings 16c of the above embodiment, notches and thin sections may also be provided in the bag holder to absorb impact. Furthermore, the openings 16c may be provided as described in Japanese Unexamined Patent Publication No. 4-166458.

In the above embodiment, the steering wheel W includes three spokes 4. However, the present invention may be applied to a steering wheel having two spokes or a steering wheel having more than three spokes.

In the above embodiment, the air bag device 13 is secured to the steering wheel body 1 by the bolts 17. However, fasteners such as rivets or clips may be used to fasten the air bag device 13 to the wheel body 1.

A threaded portion may be formed on the distal end portion of the steering shaft 30 in lieu of the adaptor 10 and the bolt 33. In such case, the boss plate 8 is mounted on the threaded portion. A nut is then fastened to the threaded portion so as to secure the boss plate 8 to the steering shaft 30.

Therefore, the present examples and embodiments are to be considered as illustrative and not restrictive and the invention is not to be limited to the details given herein, but may be modified within the scope of the appended claims.

What is claimed is:

1. A steering wheel of a vehicle having a metal ring core mounted on a steering shaft with a boss plate and at least one spoke core, the steering wheel comprising:

a cover covering the metal ring core and the at least one spoke core;

a pad located at a middle of the metal ring core over the boss plate, the pad being formed integrally with the cover;

an air bag device located between the pad and the boss plate; and a holder connected to the at least one spoke core for holding the air bag device;

wherein the holder has a substantially flat support portion supporting the air bag device and a connecting wall connecting the flat support portion to said at least one spoke core, wherein the holder includes a plurality of openings formed in both the connecting wall and the flat support portion, wherein the openings in the flat support portion are located outside the air bag device, and wherein the holder is weakened to permit the holder to deform and absorb a load acting in a generally axial direction of the steering wheel when an impact is applied to the vehicle.

2. The steering wheel according to claim 1, wherein the holder is made of a pressed metal plate.

3. The steering wheel according to claim 1, wherein the openings are formed in a circular shape.

4. The steering wheel according to claim 1, wherein the openings include slits.

5. The steering wheel according to claim 1, wherein the boss plate has an adaptor connecting the steering shaft to the boss plate, the adaptor having a cylindrical portion into which an end of the steering shaft is inserted and a pair of clamping pieces clamping the steering shaft.

6. The steering wheel according to claim 1, wherein the holder is made of a pressed metal plate.

7. The steering wheel according to claim 1, wherein the openings are formed in a circular shape.

8. A steering wheel of a vehicle having a metal ring core mounted on a steering shaft with a boss plate and three spoke cores, the steering wheel comprising:

a plurality of connecting bars connecting the three spoke cores with one another;

a cover covering the metal ring core and the three spoke cores;

a pad located at a middle of the metal ring core over the boss plate, the pad being formed integrally with the cover;

a pair of arms provided on the boss plate at a predetermined interval and protruding upward from the boss plate, each of the pair of arms being connected to two of the three spoke cores and defining a space between the boss plate and the three spoke cores;

an air bag device accommodated in the space between the pad and the boss plate; and a holder connected to the three spoke cores for holding the air bag device;

wherein the holder has a substantially flat support portion supporting the air bag device and a connecting wall portion connecting the flat support portion to the three spoke cores, wherein the holder includes a plurality of openings formed in both the connecting wall portion and the flat support portion, wherein the openings in the flat support portion are located outside the air bag device, and wherein the holder is weakened to permit the holder to deform and absorb a load acting in a generally axial direction of the steering wheel when an impact is applied to the vehicle.

* * * * *